June 25, 1946.  G. A. TINNERMAN  2,402,710

HOSE CLAMP

Filed May 24, 1944

INVENTOR.
GEORGE A. TINNERMAN
BY
Bates, Teare, y McDean
ATTORNEYS

Patented June 25, 1946

2,402,710

UNITED STATES PATENT OFFICE 2,402,710

HOSE CLAMP

George A. Tinnerman, Cleveland, Ohio, assignor to Tinnerman Products, Inc., Cleveland, Ohio, a corporation of Ohio Application May 24, 1944, Serial No. 537,023

1 Claim. (Cl. 24—19)

This invention relates to hose clamps and more particularly to that type of clamp having a metallic band that is adapted to be wrapped around the hose with the inner end of the band in sliding contact with the inner surface of the rest of the band.

One of the difficulties in obtaining a band having the aforesaid characteristics is the attainment of sufficient strength to resist the strain imposed upon it by the tightening member, and at the same time to secure a device that can be economically manufactured from sheet metal in strip form, and that will operate satisfactorily to effect a clamping action on a wide range of hose sizes.

An object of the present invention is to provide a hose clamp which can be made substantially entirely of sheet metal stock in strip form, and which will operate satisfactorily to withstand the strain incident to the tightening of a threaded member that is used for drawing the clamp about the hose, and still have sufficient relative movement between the ends thereof to permit use on a wide range of hose sizes.

Figure 1:
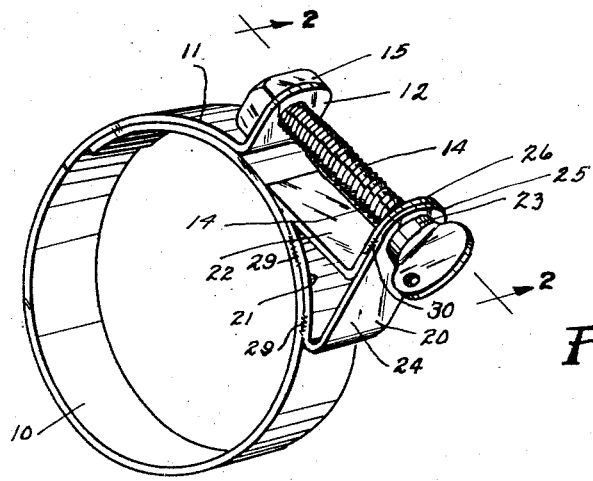
Figure 2:
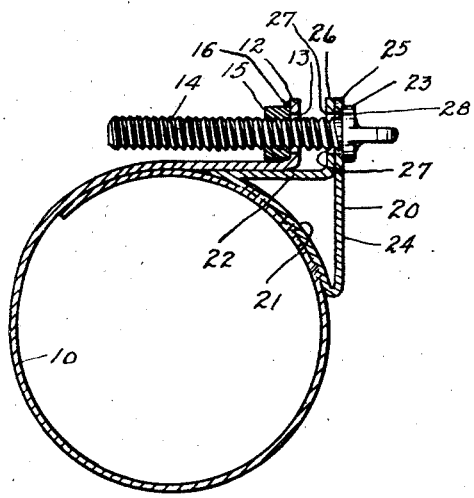

In the drawing, Fig. 1 is a perspective view of a hose clamp embodying the present invention, and Fig. 2 is a section taken through the clamp on a plane indicated by the line 2—2 in Fig. 1.

The clamp embodying the present invention has a body 10 which comprises a strip of sheet metal bent into cylindrical form with one end 11 overlapping the other. The end 11 is extended upwardly to provide an ear 12 which has an aperture 13 therein for receiving the shank of a bolt 14. In alignment with the aperture, I have shown thread-engaging means in the form of a nut 15 that has its opening in registration with the opening 13 and that is securely fastened, as by welding, to the ear 12 on the end 11, as indicated at 16, Fig. 2.

For the purpose of drawing the ends of the band together, I have shown a bolt abutment in the form of a substantially triangular shaped bracket 24 having an extreme straight leg 20, a curved intermediate leg 21, and an extreme connecting leg 22. The legs 20 and 22 extend substantially tangential to the curvature of the body, while the leg 21 is curved so as to be complementary to the curvature of the body and is rigidly fastened, as by welding, thereto, as indicated at 29, Fig. 1. The leg 20 has an extension 25 projecting in the same plane thereof, while the leg 22 has an extension 26 projecting laterally thereof and in contiguous engagement with the extension 25. The extensions are rigidly connected together, as by welding (30, Fig. 1), and are provided with bolt receiving openings 27 and 28, which are in axial alignment with the opening in the nut 15. Thus, the clamp may be tightened whenever the bolt is turned in cooperating relation with the nut.

A hose clamp embodying the present invention may be economically made, because the principal parts comprise sheet metal stampings which may be conveniently welded together, and which may be quickly brought into clamping relationship around an encircled hose. The overlapping relationship of the ends of the strip which comprises the body of the clamp affords a wide range of hose sizes upon which the clamp may be used in a successful manner.

I claim:

A hose clamp having a body comprising a strip of metal bent into substantially cylindrical form with one end portion overlapping the other end portion, the outer end portion being adapted to extend substantially tangentially, said end portion adjacent its end being bent outwardly and having a bolt opening and positioning means to engage the thread of such bolt, and a substantially triangular shaped bracket comprising a strip of sheet metal bent into three legs, the intermediate leg having a curvature complementary to the curvature of the body and being welded to the body with each of the extreme legs substantially tangent to the body, the extreme leg of the bracket which lies adjacent the said tangential extension of the body having its end portion bent up substantially at right angles, the other extreme leg of the bracket extending across and contacting with such bent up portion and being welded thereto, such welded extension and extreme leg having a bolt opening adapted to align with the bolt opening of the body, and a threaded bolt extending through all of said openings and occupying said thread engager.

GEORGE A. TINNERMAN.